| United States Patent [19] | [11] Patent Number: 4,931,496 |
| Qureshi et al. | [45] Date of Patent: Jun. 5, 1990 |

[54] DAMAGE TOLERANT FIBER-REINFORCED COMPOSITES BASED ON CYANATE ESTER/UREA THERMOSETTING COMPOSITION

[75] Inventors: Shahid P. Qureshi, Piscataway; Hugh C. Gardner; Richard H. Newman-Evans, both of Somerville, all of N.J.

[73] Assignee: Amoco Corporation, Chicago, Ill.

[21] Appl. No.: 328,513

[22] Filed: Mar. 24, 1989

Related U.S. Application Data

[60] Continuation-in-part of Ser. No. 250,838, Sep. 28, 1988, which is a division of Ser. No. 71,215, Jul. 8, 1987, Pat. No. 4,804,740.

[51] Int. Cl.$^5$ ............................................. C08L 87/00
[52] U.S. Cl. ........................... 524/612; 523/400; 523/439; 523/468; 524/588; 524/602; 524/609; 524/611; 525/421; 525/480; 525/481; 525/526; 525/534; 525/535; 525/539; 528/107; 528/119; 528/120; 528/322; 528/422
[58] Field of Search ............... 528/322, 422, 107, 119, 528/120; 525/421, 480, 481, 526, 534, 535, 539; 524/612; 523/400, 439, 468

[56] References Cited

U.S. PATENT DOCUMENTS 4,804,740  2/1989  Gardner et al. ..................... 528/422

Primary Examiner—Harold D. Anderson
Attorney, Agent, or Firm—Richard J. Schlott; William H. Magidson; Ralph C. Medhurst

[57] ABSTRACT

Fiber-reinforced compositions comprising a structural fiber and a cyanate ester resin formulation having an N-substituted urea compound as a latent cure accelerator provide rapid-curing prepreg with good out-time characteristics. The prepreg may be used to form composite articles with good toughness and excellent retention of properties on extended exposure to moisture at elevated temperatures.

20 Claims, No Drawings

DAMAGE TOLERANT FIBER-REINFORCED COMPOSITES BASED ON CYANATE ESTER/UREA THERMOSETTING COMPOSITION

CROSS-REFERENCE TO RELATED APPLICATIONS

This application is a Continuation-in-Part of U.S. application Ser. No. 07/250,838, filed Sep. 28, 1988, which was a division of SN 071,215 filed July 8, 1987, U.S. Pat. No. 4,804,740, issued Feb. 14, 1989.

BACKGROUND OF THE INVENTION

This invention relates to composites based on thermosetting cyanate esters, and more particularly to fiber-reinforced composites wherein the matrix resin comprises a cyanate ester and a urea compound latent cure acceleration.

Cyanate esters are well-known in the art and widely used in formulating adhesives, binders, coatings and impregnants. Such formulations may also include oligomeric compounds with reactive cyanate ester functionality as well as a variety of other coreactants such as epoxy resins in order to reduce costs and to modify properties such as toughness, moisture sensitivity and thermal behavior in the resulting thermoset materials.

Cyanate esters may generally be cured merely by heating. Catalysts used to promote curing under milder conditions have included Lewis acids such as aluminum chloride, ferric chloride and the like, mineral acids such as hydrochloric acid, salts such as sodium acetate, potassium thiocyanate and the like, phenolic compounds and basis such as sodium methoxide, pyridine, triethylamine and the like. Metal chelates such as copper, zinc or ferric acetylacetonates have been reported as being capable of promoting a smooth, controllable cure rate at moderate temperatures. Such catalysts are said to be generally less moisture sensitive, and possibly less hazardous than many of the catalyst systems available for cyanate esters.

Many of the prior art catalysts are highly active and many even promote rapid curing at room temperature in many cyanate ester formulations. The storage stability of cyanate ester materials and formulations based on such catalyst may therefore be brief, making the formulations difficult to use for many applications by requiring storage conditions that may be difficult or impractical to achieve. The more stable cyanate ester formulations, those based on the less-active prior art catalysts, may be more difficult to cure adequately even when extended cure cycles are used. Extended cure times, particularly at evaluated temperatures, increase the cost of production and may cause damage to substrates as well as to other components of the formulation. In addition, insufficient cure levels tend to result in brittle materials having an increased sensitivity toward moisture. Cyanate ester cure accelerators having little or no catalyst activity at or near room temperature and a high degree of activity at moderately elevated temperatures are thus needed. Such accelerators are termed latent cure accelerators, and may be used to provide storage-stable cyanate ester formulations that are rapidly and completely cured at moderate temperatures.

Some of the presently available catalysts exhibit a degree of latent curing character or latency when used in combination with some cyanate resins. However, such catalysts are few in number. The uses of cyanate ester formulations by the coatings, adhesives and laminating arts encompass a great variety of applications. The curing conditions required by these applications will vary widely, and the latent curing behavior needed for some applications may be measured in hours, while others may require stability for days or even weeks at room temperature. Moreover, the residues characteristic of some catalysts may not be acceptable for particular applications and end uses. Thus there is a continuing need for a greater variety of cure catalysts and latent cure accelerators, in order to allow the resin formulator to modify the curing behavior and storage characteristics of cyanate ester-based resin formulations, thereby becoming better able to meet the demands of these industries.

Reinforced composites based on cyanate ester matrix resins have been disclosed in the art. For example, cyanate ester-fiber glass laminates cured with metal salts such as cobalt naphthenate are described in U.S. Pat. No. 4,477,629, and the use of compositions comprising cyanate esters and bismaleimide resins, optionally including curing agents such as imidazoles or amines, as matrix resins with glass fiber is disclosed in U.S. Pat. No. 4,110,364. Although such materials are disclosed to have reduced moisture sensitivity, prepreg based on such compositions lack the latency characteristics desired by the industry. In addition, the presence of cure accelerator residues, and particularly those that are metal-based, tend to reduce the ability of the composite to resist extended exposure to moisture and to other hostile environments.

Latent curing characteristics are particularly beneficial in the manufacture of fiber-reinforced composites. While matrix resin and prepreg may be stored under refrigeration to prevent premature cure prior to use, lay-up of the prepreg when forming complex composite articles often requires lengthy exposure to ambient temperatures. Cyanate ester matrix resin formulations that have rapid curing characteristics may cure prematurely under ambient conditions, leading to loss of tack and resulting in a defective composite. Cyanate ester-based matrix resins formulated without cure accelerators may retain surface tack for sufficient time to complete the lay-up operation, but the resulting article will be difficult to fully cure due to the necessity for heating the article uniformly and throughout its substantial bulk. In addition, when the initial curing step is carried out under pressure in an autoclave, the uncatalyzed resin gels slowly, causing excessive resin flow and a squeezing-out of the resin from within the composite article.

Cyanate ester matrix resin formulations with good latency are needed to provide prepreg that will retain good tack at ambient temperatures during the lay-up operation, and then gel rapidly at moderate temperatures early in the initial heating cycle, thus resisting excessive resin flow and reducing resin loss from the structure. In addition, a cyanate ester matrix resin formulation that attains a high Tg relatively quickly in an accelerated cure is desired by the industry in order to produce a composite article that will attain good dimensional stability rather rapidly and at temperatures lower than would be needed to cure formulations without accelerator. Such articles could then be subjected to an unsupported postcure operation conducted in an ordinary oven, thus reducing the need for costly autoclave process equipment.

SUMMARY OF THE INVENTION

This invention is directed to fiber-reinforced compositions comprising a reinforcing fiber embedded in a matrix resin formulation based on a cyanate ester and an N-substituted urea compound. Prepreg based on such matrix resins exhibit good storage characteristics even at room temperature, and cure rapidly to provide dimensionally-stable composites that have excellent toughness. The composites retain stiffness at elevated temperatures to a high degree, even after extended exposure to moisture.

DETAILED DESCRIPTION

The urea compounds useful as cure accelerators in the practice of this invention are urea compounds having a plurality of N substituents. The compounds can be further represented by the structural formula $RR^1$-N-CO-N-$R^2R_3$, wherein R and $R^2$ are independently selected from hydrogen and organo radicals, and $R^1$ and $R^3$ are independently selected organo radicals. The organo radicals can be either substituted or unsubstituted aliphatic and aromatic hydrocarbyl radicals, including those selected from, for example, $C_1$ to $C_6$ alkyl radicals, aralkyl radicals, aryl radicals and the like, and R and $R^1$ may join together to form a cycloalkylene radical. The hydrocarbyl radicals may be further substituted with any of a variety of groups including halogen or the like which are inert and nonreactive toward the remaining components of the resin formulations. Examples of such urea compounds include the alkyl aryl ureas and aryl ureas such as 1,1-dimethyl-3-phenyl urea, 1,1-dimethyl-3-(4-chlorophenyl) urea, 1,1-dimethyl-3-(3,4-dichlorophenyl) urea, 1,3-diphenyl urea, 1-(4-chlorophenyl)-3-(3,4-dichlorophenyl) urea and the like. Also useful are urea compounds having a plurality of urea functional groups, including for example the reaction products of alkyl amines, alkylene diamines and dialkylene triamines with aryl isocyanates and diisocyanates, such as those urea compounds shown for example in U.S. Pat. Nos. 3,386,955 and 4,594,373.

The cyanate esters useful in preparing formulations curable with urea compounds according to the teachings of this invention are aryl compounds having a plurality of cyanate ester groups per molecule, and may be generally represented by the formula Ar(OCN)m wherein m is an integer of from 2 to 5 and Ar is an aromatic radical. The aromatic radical Ar will contain at least 6 carbon atoms, and is derived from aromatic hydrocarbons such as benzene, biphenyl, naphthalene, anthracene, pyrene or the like, or from a polynuclear aromatic hydrocarbon in which at least two aromatic rings are attached to each other through a bridging group. Also included are the cyanate esters of novolak-type phenolic resins. The aromatic radical Ar may also contain further ring-attached, non-reactive substituents.

Useful cyanate esters include, for example, 1,3-dicyanatobenzene, 1,4-dicyanatobenzene, 1,3,5-tricyanatobenzene, the isomeric dicyanatonaphthalenes, 1,3,6-tricyanatonaphthalene, 4,4'-dicyanatobiphenyl, bis(4-cyanatophenyl)methane and 3,3', 5,5'-tetramethyl-bis(4-cyanatophenyl)methane; 2,2-bis(3,5-dichloro-4-cyanatophenyl)propane, 2,2-bis(3,5-dibromo-4-dicyanatobiphenyl)propane, bis(4-cyanatophenyl)ether, bis(4-cyanatophenyl)sulfide, 2,2-bis(4-cyanatophenyl)-propane, tris(4-cyanatophenyl)phosphite, tris(4-cyanatophenyl)phosphate, bis(3-chloro4-cyanatophenyl)methane, cyanated bisphenol-terminated polycarbonate and similar thermoplastic oligomers; and mixtures thereof. Also included are cyanated novolaks, the cyanates of poly(alkenylphenol) compounds disclosed in U.S. Pat. No. 4,477,629, polycyanates derived from bisphenol adducts of dicyclopentadiene which are disclosed in, for example, U.S. Pat. No. 4,528,366, as well as the cyanates disclosed in British Patent No. 1,305,702 and the cyanates disclosed in PCT published application WO 85/02184 and in European patent application No. 269,412. These and a wide variety of other cyanate esters are widely known in the art and many are commercially available.

The cyanate esters can be used singly or as mixtures, and can also be used in the form of a prepolymer, made by heating a polyfunctional cyanate monomer at a temperature of 130° to 220° C. for a period of 0.1 to 15 hours, oligomerizing the cyanate ester and increasing the molecular weight. Also useful are mixtures of the prepolymer with monomeric cyanate esters. Many of the commercially available cyanate esters are such mixtures of cyanate monomers and prepolymers.

In general, the thermosetting compositions of this invention will comprise from about 0.5 pbw to about 12 pbw, preferably from 0.5 to about 5 pbw, of the urea compound per 100 pbw of the cyanate ester. The specific level employed will depend in part upon the particular cyanate ester and urea compounds employed.

The compositions of this invention may further comprise additional polymerizable, curable resin components, such as, for example, epoxy resins, bismaleimide resins and the like.

Epoxy resins useful as further components in the practice of this invention include any of the great variety of polyfunctional epoxy resins widely known and readily available from commercial sources. Among these are the polyglycidyl derivatives of phenolic compounds, such as those available commercially under the trade names such as Epon 828, Epon 1001, Epon 1009 and Epon 1031 from Shell Chemical Co., DER 331, DER 332, DER 334 and DER 542 from Dow Chemical Co., and BREN-S from Nippon Kayaku, Japan. Other suitable epoxy resins include polyepoxides prepared from polyols and the like and polyglycidyl derivatives of phenol-formaldehyde novolaks. The latter are commercially available as DEN 431, DEN 438, and DEN 439 from Dow Chemical Company. Cresol analogs are also available as ECN 1235, ENC 1273, and ENC 1299 from Ciba-Geigy Corporation. SU-8 is a Bis-A epoxy novalak from Hi Tek Polymers, Inc. Polyglycidyl adducts of amines, amino alcohols and polycarboxylic acids are also useful in the practice of this invention. Commercially available resins of this type include Glyamine 135, Glyamine 125, and Glyamine 115 from F.I.C. Corporation, Araldite MY-720, Araldite 0500, and Araldite 0510 from Ciba-Geigy Corporation and PGA-X and PGA-C from The Sherwin-Williams Co.

Also suitable are epoxy-terminated thermoplastic polymers such as the epoxy-terminated polysulfones disclosed in U.S. Pat. No. 4,448,948.

The bismaleimides that are useful as further components in the present invention are organic compounds containing two maleimide groups and are prepared generally from maleic anhydride and diamines. The preferred bismaleimides are derived from aromatic diamines and most preferred are those that include a polynuclear aromatic radical. Examples of such bismaleimides include 2,2-bis(4-aminophenoxy-4-phenyl)propane bismaleimide, 4,4'-bis(3-aminophenoxy)diphenyl sulfone bismaleimide, 1,4-bis(3-aminophenyl isopropylidene)benzene bismaleimide and bis(4-aminophenyl)-methane bismaleimide. The bismaleimides may be used singly or as mixtures. Bismaleimides are prepared by a number of well-known methods from maleic anhydride and diamines, and a great many are readily available from commercial sources.

The curable cyanate ester formulations of this invention may include up to about 80 parts by weight (pbw), per hundred pbw of the cyanate ester, of any of a variety of additional modifying resins to meet the requirements peculiar to the intended use. Where the added resins are also curable and thermosetting, as described above for epoxy resins, bismaleimide resins and the like, it may be necessary and desirable to include curing agents for such resins.

In addition to the curable resins, up to 30 pbw of other polymeric additives can be included as modifiers, such as thermoplastic resins, for example polysulfones, poly(aryl ethers), aromatic polyesters, polyamides, and the like, and rubbery polymeric modifiers such as silicone rubbers, diene rubbers, acrylic rubbers and rubbery polyesters. Particularly useful are those thermoplastic resins and rubbery modifiers that are miscible with cyanate esters, all of which are well-known and frequently used in the resin formulating art to modify the handling characteristics of the resin formulation as well as to provide improved toughness.

The formulations may further include organic and inorganic fillers as well as pigments, dyes, lubricants, thickeners, stabilizers and the like as is commonly practiced in the art.

The fiber-reinforced compositions of this invention comprise from about 10 to about 80 wt % reinforcing fibers. Fibers useful for the purposes of this invention include inorganic fiber such as, for example, glass fiber, carbon fiber, graphite fiber, or the like, as well as any of the variety of organic fibers known and widely used in forming composite articles, including polyarylate fibers, polyolefin fibers, aromatic polyamide fibers and the like. The fibers can be sized or unsized, and are used in chopped or continuous form or in the form of either woven or nonwoven textile fabric or mat to produce prepreg, fiber-reinforced laminates, composite articles, filled molding resins and the like. Processes for the manufacture of prepreg, laminates and composites based on thermosetting matrix resins are well known and widely practiced commercially, and such processes may be readily employed with the resin formulations of this invention as will be apparent to those skilled in the art.

The practice of this invention will be better understood from a consideration of the following illustrative examples. In the following examples, the components and test procedures used include:

Cyanate Esters
  Cyanate Ester A. Prepolymer of bisphenol A dicyanate, obtained as Aro Cy B-30 from Hi Tek Polymers.
  Cyanate Ester B. A polycyanate of a polyphenol adduct of dicyclopentadiene, obtained as XU71787 from Dow Chemical Company.
  Cyanate Ester C. A prepolymer of bisphenol A dicyanate containing 10 percent by weight of 4,4'-methylene dianiline bismaleimide, obtained as BT2160 resin from Mitsubishi Gas Chemical Company.
Epoxy Resins
  Epoxy DEN 431. Epoxidized phenol-formaldehyde novolak with a weight per epoxy equivalent of 176 g, from Dow Chemical Company
  Epoxy Epiclon 830. A bisphenol F epoxy resin with a weight per epoxy equivalent of 170 g, obtained from Dianippon Ink Company.
Thermoplastic
  Polysulfone PSF. Polyarylene ether of bisphenol A and dichlorodiphenyl sulfone, Mn=24,000, from Amoco Performance Products, Inc.
Gel Time Procedure:
  Gel times were measured by placing a small portion (~0.1 lg) of the resin mixture between two circular microscope slips on the heated stage of a Fisher-Johns melting point apparatus, preheated to 350° F. Periodically the top glass slip was poked with a wooden stiple to see if the resin was still fluid. The gel time was taken as the time when the resin first failed to flow under the influence of pressure. The gel times were an average of from two to six determinations.

The Cyanate Ester Formulations

Examples 1-11

A 4 oz glass jar charged with 50 g of the cyanate ester was heated in an oil bath at 80 to 100° C. The contents of the jar were rapidly stirred as the urea compound was added, stirred for an additional 3 min. and then removed from the bath. The gel time at 350° F. was then measured.

Table I summarizes gel times for various cyanate esters and accelerator mixtures, and for the control Examples A-D, determined without added urea compound. Typically at the 4 phr level, the accelerators of this invention reduce the gel times by ½ to ¾ of the gel time values for the unaccelerated cyanate esters.

TABLE I

Gel Times at 350° F.

| Ex. No. | Urea Cmpd (4 pbw) | Gel Time (min.) |
|---|---|---|
| Cyanate Ester A (100 pbw) | | |
| 1 | 1,1-dimethyl-3-phenyl urea | 17 |
| 2 | 3-(4-chlorophenyl)-1,1-dimethyl urea | 14 |
| 3 | 3-(3,4-dichlorophenyl)-1,1-dimethyl urea | 14 |
| 4 | 1,3-diphenyl urea | 23 |
| 5 | 2,4-bis(N,N-dimethylureido) toluene | 10 |
| A | None | >50 |
| Cyanate Ester B (100 pbw) | | |
| 6 | 1,1-dimethyl-3-phenyl urea | 29 |
| B | None | 70 |
| Cyanate Ester C (100 pbw) | | |
| 7 | 1,1-dimethyl-3-phenyl urea | 10 |
| C | None | 46 |
| Cyanate Ester A (80 pbw) and Epoxy DEN 431 (20 pbw) | | |
| 8 | 1,1-dimethyl-3-phenyl urea | 8 |
| 9 | 3-(4-chlorophenyl)-1,1-dimethyl urea | 12 |
| 10 | 3-(3,4-dichlorophenyl)-1,1-dimethyl urea | 10 |
| 11 | 1-(4-chlorophenyl)-3-(3,4-dichlorophenyl)urea | 10 |
| D | None | 22 |

It will be apparent from a comparison of the gel times for the various cyanate compositions presented in Table I that the gel times at 350° F. are markedly shortened when an organo-substituted urea compound is added thereto.

EXAMPLES 12 THROUGH 16 AND CONTROLS E THROUGH G

A series of unreinforced castings were prepared from various cyanate ester/accelerator formulations.

In a typical procedure, a 4 oz glass jar was charged with 48 g of cyanate ester and heated in an oil bath at 80° to 100° C. After the material became fluid, it was stirred while 2.0 g of a urea accelerator were added. Stirring was continued for three minutes, after which a portion of the mixture was poured into a glass mold with dimensions of ⅛"×3"×4".

The formulation was cured in an oven using the following cure schedule:

Heat from 77° F. to 248° F. at 3° F./min
Hold 2 hr at 248° F.
Heat from 248° F. to 350° F. at 3° F./min
Hold 2 hr at 350° F.
Cool to 77° F./min Test coupons with nominal dimensions of ⅛"×0.4"×3" were cut from the cured castings to determine the glass transition temperature using a DuPont 982 dynamic mechanical analyzer. The glass transition temperature was taken as the maximum in the loss modulus peak. The heating rate for all glass transition temperature measurements was 10° C./min.

EXAMPLE 17

A 250 ml, 3-necked flash equipped with a paddle stirrer, thermometer, inlet and outlet for inert gas, and heated in an oil bath was charged with 18 g of Epiclon 830 and 8 g of powdered polysulfone. The mixture was heated and stirred for 1 hr at 140° C. as the polysulfone dissolved. To this stirred solution at 140° C. was added 72 g of warm (100° C.) Cyanate Ester B over a 5 minute period. As soon as the addition was complete, the mixture was stirred for 5 more minutes as it cooled to 100° C. To this solution was added 2.0 g of 1,1-dimethyl-3-phenyl urea. The mixture was poured into a glass mold having a cavity with dimensions of ⅛"×4"×3" and cured using the following cure schedule:

Heat from 77° F. to 350° F. at 1.1° F./min.
Hold 2 hr. at 350° F.
Cool to 77° F. at approx. 2.2° F./min.

The cured casting was hard and clear. A coupon with approximate dimensions of 0.4"×3.0"×⅛ was cut from the casting and was used to measure the glass transition temperature on a DuPont DMA (scan rate: 10° C. per minute). The glass transition temperature was 218° C.

Example 18

Following the procedure in Example 17, an unreinforced casting was prepared from 98 g of the Epiclon 830/polysulfone/Cyanate Ester B masterblend (18/8/72 wt. ratio) and 6.0 g of 1,1-dimethyl-3-phenyl urea. The glass transition temperature on the cured casting was 218° C.

Control H

An unreinforced casting was prepared using Epiclon 830/polysulfone/Cyanate Ester B masterblend (18/8/72 wt. ratio). The procedure was the same as in Examples 17 and 18 except that no urea compound was used as an accelerator. The unreinforced casting had a glass transition temperature of 133° C.

Table II summarizes the glass transition temperatures of several cyanate ester/accelerator formulations.

TABLE II

| | Cured Castings | |
|---|---|---|
| Ex. No. | Urea Cmpd | Tg °C. |
| Cyanate Ester A (100 pbw) | | |
| 12 | 1,1-dimethyl-3-phenyl urea (4 pbw) | 197 |
| 13 | 1,1-dimethyl-3-phenyl urea (6.7 pbw) | 218 |
| 14 | 1-(4-chlorophenyl)-3-(3,4-dichlorophenyl) urea (4 pbw) | 216 |
| E | None | 124 |
| Cyanate Ester C (100 pbw) | | |
| 15 | 1-(4-chlorophenyl)-3-(3,4-dichlorophenyl) urea (4 pbw) | 195 |
| F | None | 88 |
| Cyanate Ester A (80 pbw) and Epoxy DEN 431 (20 pbw) | | |
| 16 | 1-(4-chlorophenyl)-3-(3,4-dichlorophenyl) urea (4 pbw) | 245 |
| G | None | 233 |
| Cyanate Ester B (72 pbw), Epoxy Epiclon 830 (18 pbw) and PSF (8 pbw) | | |
| 17 | 1,1-dimethyl-3-phenyl urea (2 pbw) | 218 |
| 18 | 1,1-dimethyl-3-phenyl urea (6.1 pbw) | 218 |
| H | None | 133 |

Note: Cure schedules and conditions are shown in text.

The Tg data for the various unreinforced castings summarized in Table II demonstrate the high degree of cure obtained with the compositions of this invention under standard cure schedules commonly used in the art. Equivalent formulations without a cure accelerator achieved much lower degree of cure when subjected to equivalent cure schedules.

EXAMPLE 19

A 500 ml 3-necked flask equipped with a paddle stirrer, thermometer, inlet and outlet for inert gas, and an electric heating mantle was charged with 200 g of Cyanate Ester A. The resin was heated with stirring to 90° C. at which temperature a mixture of 8.0 g of DEN 431 epoxy novolak resin and 8.0 g of 1,1-dimethyl-3-phenyl urea was added. The mixture was stirred for 1.5 hr at 100° C., degassed to remove trapped air bubbles, and then poured into a glass mold with dimensions of ⅛"×8"×9". The resin was cured in a forced air oven using the following cure schedule:

Heat from 77° F. to 248° F. in 1 hr
Hold at 248° F. for 1 hr
Heat form 248° F. to 350° F. in 1 hr
Hold at 350° F. for 2 hr
Cool for 350° F. to 77° F. in 1 hr The cured casting was hard and transparent. Specimens were cut from the casting to measure mechanical and thermal properties. The tensile strength of the cured resin was measured according to ASTM D-638 (Type 1 dogbone) and was found to be 10,500 psi. The tensile modulus was 465 ksi. The glass transition temperature was 220° C.

Example 20

A 16 oz. glass jar was charged with 243 g of Cyanate Ester A and 45 g of a blend of Epoxy DEN 431 and PSF (3:1 by weight) and heated in a forced air oven at 80° C. for 15 min. The jar was then removed from the oven and the contents were stirred for 5 min. to ensure homogeneity before adding 12 g of 1-(4-chlorophenyl)-3-(3,4-dichlorophenyl) urea. The gel time at 350° C. was 9.3 min. The mixture was cast and cured as in Example 12–16, to provide test specimens. The Tg, determined as before, was 253° C.

The Composites

Example 21

A 5 l flask equipped with a paddle stirrer, thermometer, inlet and outlet for inert gas and heated in an oil bath was charged with 2315 g of Cyanate Ester A, 92.5 of Epoxy DEN 431, and 92.5 g of 1,1-dimethyl-3-phenyl urea. The mixture was heated at 95° C. for 1.75 hrs to adjust its viscosity for making prepreg.

A thin film of the resin was cast on a siliconecoated release paper. A unidirectional prepreg tape was made by transferring the resin from the coated paper to a ribbon of carbon fiber under the action of heat and pressure in a prepreg machine. The final prepreg had a fiber areal weight of 143 g/m$^2$ a resin content of 33.4 percent by weight, and a width of 12 inches. The fiber used to make the tape was a pitch-based carbon fiber with a tensile strength of 260 ksi, a tensile modulus of 75 msi, density of 2.0 g/cc, and a filament count of 2,000 filaments per tow, obtained as P-75 Thornel carbon fiber from Amoco Performance Products, Inc. When store at room temperature, the prepreg retained tack and drape characteristics for more than 15 days, demonstrating that the cure accelerators of this invention possess a low degree of room temperature cure activity, i.e., good latency.

The unidirectional tape was laid up into an 8-ply quasi-isotropic laminate with a (0, ±45, 90)$_s$ configuration. The laminate was cured in an autoclave under a pressure of 100 psi at a temperature of 350° F. for 2 hrs. The cured laminate was rigid and hard.

Example 22

A 2 l, 3-necked flask equipped with thermometer, inlet and outlet for inert gas, a paddle stirrer, and heated in an oil bath was charged with 180 g of Epiclon 830 and 80 g of powdered polysulfone. The mixture was heated and stirred for 45 min at 140° C. as the polysulfone dissolved. To this stirred solution at 140° C. was added 720 g of Cyanate Ester B over a 10 min period. As soon as the addition was complete, the mixture was cooled with stirring at 100° C. Ten minutes later, when the mixture reached 100° C., 40 g of 1,1-dimethyl-3-phenyl urea was added. The mixture was heated and stirred at 100° C. for 15 minutes and then discharged into pans. Another 1000 g resin batch of Epiclon 830/polysulfone/Cyanate Ester B/1,1-dimethyl-3-phenyl urea was prepared in an identical manner. The two resin batches were combined, warmed to 80° C., and coated as a thin film on release paper. A unidirectional prepreg tape was prepared by transferring the resin from the coated paper to a ribbon of carbon fiber under the action of heat and pressure in a prepreg machine. The final prepreg had a fiber areal weight of 147 g/m$^2$, resin content of 36.8 percent by weight, and nominal width of 12 inches. The fiber used to make the tape was a polyacrylonitrile-based carbon fiber with a tensile strength of 730 ksi, tensile modulus of 41.5 msi, density of 1.8 g/cc, yield of 0.44 g/m and filament count of 12,000 per tow, obtained as T650-42 Thornel carbon fiber from Amoco Performance Products, Inc. The uncured prepreg tape, stored at room temperature, retained tack and drape for more than 14 days, again demonstrating the excellent latency of cyanate ester formulations that incorporate the urea cure accelerators of this invention.

The unidirectional tape was laid up into a 32 ply, 15"×15" laminate with an orientation of (0, ±45, 90)$_{4s}$. The laminate was cured in an autoclave under a pressure of 100 psi using a straight up cure cycle (ramp from 77° F. to 350° F. at 3° F./min; hold 2 hr at 350° F.; cool to 77° F. at 3° F./min). The cured laminate was machined into 4"×6" test panels. The panels had a nominal thickness of 0.18 inches and were impacted in the center with a Gardner type impact tester (Gardner Laboratories, Bethesda, Md.) having a $\frac{5}{8}$ inch diameter spherical identer. The impact was normal to the plane of fibers. When impacted, the 4"×6" panel was simply supported over a 3"×5" cutout in an aluminum plate with a plywood backup. The impacted panel was tested for residual compressive strength in a steel fixture that constrained the edges from out-of-plane buckling. After an impact of 1500 in-lb/in of thickness, the test panel had a residual compressive strength of 31 ksi.

Example 23

A 2 liter, 3-necked flask equipped with a paddle stirrer, thermometer and inlet and outlet for inert gas was charged with 860 g of Cyanate Ester B.

The flask was placed in an oil bath at 100° C. and the contents were stirred as 120 g of Epoxy DEN 431 was added. The resulting solution was stirred at 100° C. for 10 minutes. Then 20 g of 1,1-dimethyl-3-phenyl urea were added and agitation was continued for an additional 5 minutes, after which the resin was discharged into pans and cooled.

The urea-accelerated resin was warmed to 80° C. and coated as a thin film on silicone treated release paper in a strip about 7 inches wide. A unidirectional tape was made by sandwiching a ribbon of unsized T650-42 carbon fiber between two layers of resin-coated release paper and then subjecting that sandwich to heat and pressure in a prepreg machine. The prepreg tape was 6 inches wide, had a fiber areal weight of 146 g/m$^2$ and contained 30.2 weight percent resin. The fiber used to make the tape was a polyacrylonitrile-based carbon fiber with a tensile strength of 730 ksi, a tensile modulus of 41.5 msi, a yield of 0.44 g/m, and a filament count of 12,000 per tow.

The tape was laid up into a sixteen-ply unidirectional laminate (6"×12") and cured in an autoclave using the following cure schedule:

Heat from 75° F. for 266° F. at 3° F./min.
Hold from 266° F. for 1 hr.
Heat from 266° F. to 350° F. at 3° F./min.
Hold at 350° F. for 4 hr.
Cool from 350° F. to 77° F. at 3° F./min.

The laminate was postcured in a forced air oven at 220° C. for 4 hr. The postcured laminate was machined into test coupons to measure 0° flexural strength according to ASTM D-790. When tested at 350° F., the laminate had a flexural strength of 163 ksi, a flexural modulus of 21.7 msi and a fiber volume fraction of 58.8 percent. Another coupon was immersed in water at 160° F. for two weeks prior to testing. When tested at 350° F., this sample had a flexural strength of 137 ksi and modulus of 19.8 msi, indicating good property retention at elevated temperature under wet conditions.

EXAMPLE 24

Prepreg tape made in Example 23 was laid up into a 6"×12" 10-ply laminate with a configuration of ((±30)$_2$90)$_S$. The laminate was cured and postcured as in Example 23 and then cut into 1"×10" strips for edge delamination strength testing. Edge delamination strength is a measure of composite toughness. The details of the test are described in the reference: SAMPE Journal Vol. 18, No. 4, July/August 1982, p. 8 by T. K. O'Brien.

The edge delamination strength of the laminate was determined to be 32.2 ksi.

EXAMPLE 25

Prepreg tape made in Example 23 was laid up into an 8-ply 6"×12" laminate with a $(\pm 45)_{2s}$ configuration. The laminate was cured and postcured as in Example 23 and then cut into 1" by 10" strips to measure high temperature property retention in the wet condition. The specimens were immersed in water at 160° F. for 2 weeks and then placed in an Instron testing machine to determine stiffness. The stiffness in tension of the moisture-conditioned specimen was determined at room temperature and at 350° F. after heating the specimen to that temperature in less than one minute. In this test the moisture conditioned composite retained 62 percent of its room temperature stiffness at 350° F., indicating excellent retention of stiffness at elevated temperature under wet conditions.

EXAMPLE 26

A 1 gallon working capacity Baker Perkins sigma blade mixer was charged with 4.0 Kg of Cyanate Ester A. The resin was heated to 140° C. and then 1.0 Kg of powdered polysulfone was added. The cyanate ester polysulfone mixture was blended and heated at 140° C. until all the polysulfone dissolved (2.5 hr), then cooled and discharged from the mixer.

A 2.0 Kg portion of the cyanate ester/polysulfone solution was blended with an additional 2.0 Kg of Cyanate Ester A at 80° C. for 1 hour. A dispersion of 160 g of 1-(4-chlorophenyl)-3-(3,4-dichlorophenyl) urea in 400 g Epoxy DEN 431 was added and mixing was continued for an additional 30 min. before discharging and cooling the resin formulation.

A sample of the resin was placed in a Brookfield Thermosel viscometer and the viscosity of the mixture was measured as the temperature of the Thermosel was raised at 1.1° C./min. The viscosity of the resin was approximately 100,000 cps at 70° C. The minimum viscosity was 2,500 cps at 135° C., after which the viscosity started to increase due to the effect of the urea accelerator on the cure.

A thin film of the resin was cast onto a siliconecoated release paper. A unidirectional prepreg tape was made by transferring the resin from the coated paper to a ribbon of carbon fiber under the action of heat and pressure in a prepreg machine. The final prepreg had a fiber areal weight of 141 g/m², a resin content of 38.4 percent by weight, and a width of 12 inches. The fiber used to make the tape was a T-50 Thornel carbon fiber obtained from Amoco Performance Products, Inc., with a tensile strength of 350 ksi, tensile modulus of 57 msi, yield of 0.36 g/m, and filament count of 6,000 per tow. The unidirectional tape made with this resin retained tack and drape for more than 15 days.

Example 27

The procedures of Example 26 were followed in preparing a prepreg using the same resin system with P-75 Thornel carbon fiber from Amoco Performance Products, Inc. The final prepreg had a fiber areal weight of 118.5 g/m², a resin content of 36.9 wt % and a width of 12 inches. The tape was used to form a composite substantially by the procedures of Example 23, using a cure of 2 hr at 350° F. The composite samples were evaluated for 0° short beam shear strengths following the procedures of ASTM 2344, using a 4:1 span-to-depth ratio. The shear strength at 77° F. was 8.3 Kpsi, at 300° F. was 6.8 Kpsi and 350° F. was 5.4 Kpsi. A prior art composite with a shear strength of 9.7 Kpsi at 77° .F lost substantially all shear strength by 350° F., and had only 1.9 Kpsi shear strength at 300° F.

EXAMPLE 28

A 3 1, 3-necked flask equipped with a paddle stirrer, heating mantle, thermometer and inert gas inlet and outlet, was charged with 540 g of Cyanate Ester B. The flask was heated with stirring to 120° C., and then 23 g of a rubbery polyester, obtained as LP-011 from Nippon Gohsei, were added. The mixture was stirred until the rubbery polyester was dissolved, about 20 min. After cooling to 100° C., 11.5 g of 1,1-dimethyl-3-phenyl urea were added and stirring was continued for an additional 10 min before the resin was discharged and cooled.

Composites were prepared from the resin formulation. Prepreg was prepared following substantially the procedures of Example 23, using the same type of carbon fiber. Composite specimens were prepared substantially by following the procedures used in Example 24. The edge delamination strength of the composite was determined to be 38.0 ksi.

It will be apparent from the properties of the cured composites of the foregoing examples, together with the excellent toughness as shown by edge delamination strength and residual compressive strength properties, that the composites prepared according to the teachings of this invention exhibit outstanding toughness, and retain stiffness after exposure to moisture at elevated temperatures. Both unsized and sized carbon fiber were used in the preparation of the various composite examples. It will be understood by those skilled in the art that such fiber modifications may alter the adhesion characteristics between the fiber and the matrix resin, and affect the physical properties and environmental resistance of the final composite.

It will be further understood that fiber-reinforced composites having equivalent stiffness can be prepared from cyanate esters cured without an accelerator, or by using a metal-containing curing aid of the prior art such as copper acetylacetonate in place of the latent curing accelerators of this invention. However, as set forth hereinabove, the use of the latent cure accelerators of this invention allows greater latitude in the fabrication of complex composite articles than formulations without accelerators, and without detrimentally affecting the hot/wet properties of the final composite, as is often the result when the metal-containing curing aids of the prior art are employed.

The invention will thus be seen to be directed to fiber-reinforced compositions based on cyanate esters and organo urea compounds as latent cure accelerators. The urea compounds useful as latent cure accelerators in the practice of the invention have a plurality of organo radicals as N-substituents. These substituents can be aliphatic or aromatic hydrocarbyl radicals, such as, for example, alkyl, alkylene, aralkyl, aryl and the like, and can also include further substituent groups such as halogen or the like that are not reactive with the remaining components. The cyanate ester formulations in combination with continuous fiber reinforcement provide prepreg with extended out-time and good storage characteristics, without detrimentally affecting the properties of the resulting composites. Composites prepared from such prepreg exhibit good toughness and good resistance to moisture, even at elevated temperatures. While the invention has been illustrated by means of various examples which are intended to be non-limiting, it will be apparent to those skilled in the art that further modifications and variations are possible without departing from the spirit and scope of the invention, which is defined by the appended claims.

We claim:

1. A fiber-reinforced composition comprising:
   (a) a thermosetting composition comprising 100 pbw of a cyanate ester and from about 0.5 to about 12 pbw of at least one urea compound having the structural formula $RR^1NCONR^2R^3$ wherein R and $R^2$ are independently selected from the group consisting of hydrogen and organo radicals, and $R^1$ and $R^3$ are independently selected organo radicals; and
   (b) a reinforcing fiber.

2. The composition of claim 1 wherein the organo radicals are hydrocarbyl radicals selected from the group consisting of alkyl, aralkyl, and aryl radicals.

3. The composition of claim 1 wherein the urea compound is an alkyl aryl urea selected from the group consisting of 1,1-dimethyl-3-phenyl urea, 1,1-dimethyl-3-(4-chlorophenyl) urea, 1,1-dimethyl-3-(3,4-dichlorophenyl) urea, and 2,4-bis(N,N-dimethylureido)-toluene.

4. The composition of claim 1 wherein the urea compound is a diaryl urea selected from the group consisting of 1,3-diphenyl urea, and 1-(4-chlorophenyl)-3-(3,4-dichlorophenyl)urea.

5. The composition of claim 1 in the form of a prepreg.

6. The composition of claim 1 in the form of a composite.

7. The composition of claim 1 comprising from 10 to about 80 wt. % of said reinforcing fiber.

8. The composition of claim 1 wherein said reinforcing fiber is carbon fiber.

9. A fiber-reinforced composition comprising:
   (a) from about 20 to about 90 wt. % of a thermosetting matrix resin comprising 100 pbw of a cyanate ester and from about 0.5 to about 12 pbw of at least one urea compound selected from the group consisting of alkyl aryl ureas, and aryl ureas; and
   (b) from about 10 to about 80 wt. % of a carbon fiber.

10. The fiber-reinforced composition of claim 9, further comprising up to 80 pbw of at least one curable epoxy resin.

11. The fiber-reinforced composition of claim 9, further comprising up to 30 pbw of a polymeric additive selected from the group consisting of thermoplastic resins and rubbery polymeric modifiers.

12. The fiber-reinforced composition of claim 9 in the form of a prepreg.

13. The fiber-reinforced composition of claim 9 in the form of a cured composite.

14. A fiber-reinforced composition comprising:
   (a) from about 20 to about 90 wt % of a thermosetting matrix resin comprising 100 pbw of a cyanate ester, 0.5 to about 12 pbw of at least one urea compound selected from the group consisting of alkyl aryl ureas, and aryl ureas, up to 80 pbw of an epoxy resin, and up to 30 pbw of a polymeric additive; and
   (b) from about 10 to about 80 wt. % of a carbon fiber.

15. The composition of claim 14 wherein said urea compound is an alkyl aryl urea selected from the group consisting of 1,1-dimethyl-3-phenyl-urea, and 2,4-bis(N,N-dimethylureido) toluene.

16. The composition of claim 14 wherein said cyanate resin is a polycyanate of a polyphenol adduct of dicyclopentadiene.

17. The composition of claim 14 wherein said urea compound is a diaryl urea selected from the group consisting of 1,3-diphenyl urea, and 1-(4-dichlorophenyl)-3-(3,4-dichlorophenyl)urea.

18. The composition of claim 14 in the form of a prepreg.

19. The composition of claim 14 in the form of a composite.

20. The composition of claim 14 wherein said polymeric additive is selected from the group consisting of thermoplastic polymeric resins and rubbery polymeric modifiers.

* * * * *